United States Patent
Lu et al.

(10) Patent No.: US 11,874,362 B2
(45) Date of Patent: Jan. 16, 2024

(54) INTEGRATED TWO-DIMENSIONAL MULTI-BEAM LIDAR TRANSMITTER BASED ON BUTLER MATRIX

(71) Applicant: Shanghai Jiao Tong University, Shanghai (CN)

(72) Inventors: Liangjun Lu, Shanghai (CN); Chen Zhu, Shanghai (CN); Linjie Zhou, Shanghai (CN); Jiao Liu, Shanghai (CN); Jianping Chen, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 765 days.

(21) Appl. No.: 17/061,126

(22) Filed: Oct. 1, 2020

(65) Prior Publication Data
US 2021/0018603 A1  Jan. 21, 2021

Related U.S. Application Data

(63) Continuation of application No. PCT/CN2019/084897, filed on Apr. 29, 2019.

(30) Foreign Application Priority Data

Dec. 6, 2018 (CN) .......................... 201811484764.7

(51) Int. Cl.
  G01S 7/4911 (2020.01)
  G01S 7/481 (2006.01)
  (Continued)

(52) U.S. Cl.
  CPC .......... *G01S 7/4911* (2013.01); *G01S 7/4815* (2013.01); *G02B 6/12007* (2013.01); *G02B 6/29395* (2013.01)

(58) Field of Classification Search
  CPC . G01S 7/4911; G01S 7/4815; G02B 6/12007; G02B 6/29395; H01Q 3/2676; H01Q 3/40
  See application file for complete search history.

(56) References Cited

U.S. PATENT DOCUMENTS

2014/0269790 A1  9/2014 Sebastian et al.
2017/0062948 A1* 3/2017 Artemenko ............ H01Q 9/065
(Continued)

FOREIGN PATENT DOCUMENTS

CN        1921341 A    2/2007
CN      108306110 A    7/2018
(Continued)

OTHER PUBLICATIONS

Acoleyen, K. V. et al., 2009, "Off-chip beam steering with a one-dimensional optical phased array on silicon-on-insulator", Optics Letters, 34(9) (Year: 2009).*
(Continued)

*Primary Examiner* — Isam A Alsomiri
*Assistant Examiner* — Joseph C Fritchman
(74) *Attorney, Agent, or Firm* — Mei & Mark LLP; Manni Li

(57) ABSTRACT

Integrated two-dimensional multi-beam LiDAR transmitter based on the Butler matrix, comprising an tunable laser array, a frequency modulated continuous wave modulator array, an N×N Butler optical matrix network, an N×M optical beam expanding network, an M-path phase shifter array, and an M-path two-dimensional LiDAR emitters. N-path narrow linewidth continuous light output by the tunable laser array passes through the frequency modulated continuous wave modulator array to generate N-path frequency modulated continuous light signals; after processed by the N×N Butler matrix and the N×M optical beam expanding network, energy of each path of the frequency
(Continued)

modulated continuous optical signal is evenly distributed to the M-path output ports, and the M-path phase shifter array generates equal-difference phases with continuously tunable phase differences for M-path optical signals, which, with continuously tunable phase differences, are transmitted by M-path two-dimensional LiDAR emitters to realize no more than N different two-dimensional steerable transmitting optical beams.

10 Claims, 7 Drawing Sheets

(51) Int. Cl.
   *G02B 6/12* (2006.01)
   *G02B 6/293* (2006.01)

(56) References Cited

U.S. PATENT DOCUMENTS

2017/0371227 A1* 12/2017 Skirlo .................. G02F 1/2955
2018/0306925 A1* 10/2018 Hosseini ................ G01S 17/42

FOREIGN PATENT DOCUMENTS

CN 108646430 A 10/2018
CN 108761439 A 11/2018

OTHER PUBLICATIONS

Poulton, C. V. et al., 2017, "Coherent solid-state LIDAR with silicon photonic optical phased arrays", Optics Letters, 42(20) (Year: 2017).*

Madrid, D., 2002, "A Novel 2N Beams Heterodyne Optical Beamforming Architecture based on NxN Optical Butler Matrices", 2002 IEEE MTT-S International Microwave Symposium Digest (Cat. No.02CH37278), Seattle, WA, USA, 2002, pp. 1945-1948 vol.3 (Year: 2002).*

Karel Van Acoleyen et al., "Off-chip beam steering with a one-dimensional optical phased array on silicon-on-insulator," Optics Letters, vol. 34, No. 9, pp. 1477-1479 (May 1, 2009).

Hooman Abediasl et al., "Monolithic optical phased-array transceiver in a standard SOI CMOS process," Optics Express, vol. 23, No. 5, pp. 6509-6519 (Mar. 5, 2015).

David N. Hutchinson et al., "High-resolution aliasing-free optical beam steering," Optica, vol. 3, No. 8, pp. 887-890 (Aug. 2016).

* cited by examiner

INTEGRATED TWO-DIMENSIONAL MULTI-BEAM LIDAR TRANSMITTER BASED ON BUTLER MATRIX

CROSS-REFERENCE TO RELATED APPLICATIONS

The subject application is a continuation of PCT/CN2019/084897 filed on Apr. 29, 2019, which claims priority on Chinese Application No. CN201811484764.7 filed on Dec. 6, 2018 in China. The contents and subject matter of the PCT international application and Chinese priority application are incorporated herein by reference.

TECHNICAL FIELD

The present invention relates to LiDARs, in particular, an integrated two-dimensional multi-beam LiDAR transmitter based on the Butler matrix.

BACKGROUND ART

LiDAR (light detection and ranging) is a radar system for detecting scattered light characteristics of a long-distance target to obtain relevant information on the target. Since the concept of the LiDAR was put forward in the last century, many countries, enterprises and research institutions have deeply studied and explored its manufacturing methods. By studying the characteristics of optical beam and improving the implantation method of the traditional radar, the performance of LiDARs have been improved significantly. The LiDAR takes a laser as a light source, and adopts photodetection means to realize three-dimensional imaging, tracking, guidance, detection, and accurate distance measurement, and thus, is particularly attractive in aspects of national defense and civil use. The LiDAR usually steers light beam by mechanical solutions, which has the disadvantages of large volume, slow scanning speed, and large inertia. Recently, integrated optical phased array technology has been proposed by researchers to achieve light beam steering with its characteristics of low power consumption, low weight, small volume, and high speed, which is a key technology of LiDAR development in the future. The steering of light beam is based on the control of phase of the optical phased array to control beam wavefront. It makes the LiDAR not longer just rely on mechanical light beam guidance, but also greatly improve response speed, target capacity, and reliability of the LiDAR system. Certainly, due to the wavelength limitation on the size of LiDAR antennas, large-scale integrated phased arrays are large in size and high in cost, which is only used in military applications in the past. However, with the development and progress of silicon photonic integration technology, the cost and size of large-scale integrated chips are gradually decreasing, which creates conditions for the application of optical phased array based LiDAR in military and civil applications.

Since the application of optical phased array in LiDAR has been proposed, many research teams and laboratories have carried out intensive research and have made great progress. As early as 2009, a 16-channel two-dimensional optical phased array device (See Optics Letters, Vol. 34, No. 9, pp. 1477-1479) was implemented on a silicon platform with a pitch of 2 um between adjacent waveguides. Continuous thermo-optical steering of 2.3°, and wavelength steering of 14.1° is reported. Due to the small pitch of equally spaced phased array, the crosstalk between the waveguides was relatively large. In 2015, a fully integrated 32-channel optical phased array chip for two-dimensional dynamic wave beam steering was implemented (See Optics Express, Vol. 23, No. 5, pp. 6509-6519) on a hybrid silicon platform, which was the first monolithic integrated two-dimensional phased array transceiver with electronic control circuits, but only achieved 5.5 dB background suppression in the far field. In 2016, a two-dimensional non-uniform emitter spacing on an optical phased array was disclosed (See Optica, Vol. 3, No. 8, pp. 887-890) to verify the performance of the aliasing-free beam steering. This chip realizes more than 500 resolvable spots and 80° steering in the phased-array axis and a record small divergence (0.14°) in both axes. The total resolvable spots are more than 6000.

However, most of the implementation solutions of the optical phased arrays are single-beam LiDAR, anti-interference and survivability of a LiDAR is low, and the beam emitting angle and data rate cannot be fully utilized.

SUMMARY OF THE PRESENT INVENTION

In order to improve the anti-interference capability and survivability of a LiDAR, make full use of the beam emitting angle range, and improve a data rate of the LiDAR, the present invention provides a transmitting solution of a two-dimensional multi-beam LiDAR. In particular, the present invention provides an integrated two-dimensional multi-beam LiDAR transmitter based on a Butler matrix.

The present invention provides an integrated two-dimensional multi-beam LiDAR transmitter based on a Butler matrix, comprising a tunable laser array, a frequency modulated continuous wave (FMCW) modulator array, an N×N Butler optical matrix network, an N×M optical beam expanding network, an M-path phase shifter array, and an M-path two-dimensional LiDAR emitters. In the system of the present invention, the tunable laser array is a narrow linewidth laser array, and a narrow linewidth continuous light output by the tunable laser array passes through the FMCW modulator array to generate N-path FMCW signals; after being processed by the N×N Butler matrix network and the N×M optical beam expanding network, the energy of each path of the FMCW optical signal is evenly distributed to M-path output ports, and output signals of adjacent output ports have equal phase differences; the M-path phase shifter array generates equal-difference phases with continuously adjustable phase differences for the M-path optical signals from the M-path output ports; the M-path optical signals with continuously adjustable phase differences are transmitted by the M-path two-dimensional LiDAR emitters so that no more than N different two-dimensional steerable transmitting beams are realized, wherein $N=2^n$ (n=1, 2, ...), $M=2^K \times N$ (K=1, 2, ...).

In the LiDAR transmitter of the present invention, the tunable laser array may comprise N tunable lasers; the N tunable lasers simultaneously transmit N-path narrow linewidth continuous light with equal light intensity; the wavelength of each path of narrow linewidth continuous light is tunable; and the tuning range is in a human eye safety area.

In the LiDAR transmitter of the present invention, the FMCW modulator array may comprise N FMCW modulators and a chirped radio frequency modulation signal generator, wherein an $i^{th}$ path of the FMCW modulator is connected with an $i^{th}$ path of the tunable laser (i=1, 2, ... and N), and the chirped radio frequency modulation signal generator applies the chirped radio frequency signal onto the FMCW modulator to generate a frequency modulated continuous optical signal; and the FMCW modulator is an electro-optical modulator or an I/Q modulator.

In the LiDAR transmitter of the present invention, the N×N Butler optical matrix network may comprise N/2×n 90° optical hybrids, N/2×(n−1) phase shifters and connecting waveguides; the N×N Butler optical matrix network has N input ports and N output ports; the $i^{th}$ input port is connected with the $i^{th}$ FMCW modulator; the optical signals of each input port are equally divided to all output ports; and adjacent output ports have a fixed same phase difference, and the optical signals input from different input ports differ in phase difference at the output ports, thereby forming N different optical beams.

In the LiDAR transmitter of the present invention, the 90° optical hybrid may be a 2×2 multimode interferometer (MMI) or a directional coupler, and the 90° optical hybrid has two input ports and two output ports; and the phase shifter is based on a thermo-optic effect or an electro-optic effect, and the phase tuning range of the phase shifter is 0-2π.

In the LiDAR transmitter of the present invention, the N×M optical beam expanding network may comprise a K-stage expanding array and connecting waveguides connecting adjacent two expanding array stages, and a $k^{th}$ stage expanding array consists of N×k 1×2 optical beam splitters and N×k 180° phase shifters, wherein (k=1, 2, ..., K); the N×M optical beam expanding network has N input ports and M output ports, wherein $M=N\times2^K$ (K=1, 2, ...), and the $i^{th}$ input port of the N×M optical beam expanding network is connected with the $i^{th}$ output port of the N×N Butler optical matrix network; and the N×M optical beam expanding network evenly distributes and expands N-path optical signals into M-path optical signals by the N×N Butler optical matrix network. Adjacent output signals have equal phase differences, and the phase differences of the output signals are consistent with the phase differences of the input signals.

In the LiDAR transmitter of the present invention, the 1×2 optical beam splitter may be a 1×2 MMI structure or a 1×2 Y-junction structure, the 180° phase shifter is a 180° phase shifter based on a thermo-optic effect or an electro-optic effect, and the phase tuning range of the 180° phase shifter is 0-2π.

In the LiDAR transmitter of the present invention, the M-path phase shifter array may comprise an M-path phase shifter, the $m^{th}$ (m=1, 2, ..., M) path phase shifter is connected with the $m^{th}$ path output port of the N×M optical beam expanding network, the M-path phase shifter array performs phase shift on an input optical signal, so that the adjacent output signals has an equal difference in phase, and the phase difference is continuously adjustable; and the M-path phase shifter is a phase shifter based on a thermo-optic effect or an electro-optic effect, and the phase tuning range of the phase shifter is 0-2π.

In the LiDAR transmitter of the present invention, the M-path two-dimensional LiDAR emitters may comprise an M-path grating-based optical antennas, and the $m^{th}$ (m= 1, 2, ..., M) grating-based optical antennas is connected with the $m^{th}$ path phase shifter and transmits the $m^{th}$ path optical signal, wherein the M-path grating-based optical antennas are double-layer silicon nitride gratings or shallow-etching silicon waveguide gratings.

In the LiDAR transmitter of the present invention, the angle of the transmitting optical beam vertical to the grating emitters may be steered by adjusting the phase shift of the M-path phase shifter array, the angle of the transmitting optical beam parallel to the grating emitters may be steered by tuning the wavelength of the tunable laser array, so that the transmitted optical beam is steered in two dimensions, and N different beams may be realized because different input optical signals have different equal phase differences at the output ports.

In the present invention, preferably, the solution can be realized by a monolithic or heterogeneous photonic integration technology, comprises a material platform of silicon, silicon nitride, III/V and the like, and realizes a miniaturized and low-cost multi-beam two-dimensional LiDAR transmitter chip.

Compared with the existing technology, the present invention has following beneficial effects.

(1) According to the present invention, two-dimensional multi-beam can be generated. Compared with the one-dimensional single-beam LiDAR, the present invention improves anti-interference capability and survivability of a LiDAR, makes full use of the energy of transmitted wave beam, and improves a data rate of the LiDAR.

(2) According to the present invention, the FMCW signal is adopted as an optical transmitting signal so that anti-interference and detection sensitivity are higher and low transmitting power and long-distance detection are realized.

(3) The present invention has the advantages of flexible structure, simple control, strong scalability, easy integration, small size and low power consumption.

Reference numbers used in the Figures refer to the following structures: 11—tunable laser; 12—frequency modulated continuous wave modulator; 13—chirped radio frequency signal; 14—tunable phase shifter.

DETAILED DESCRIPTION OF THE PRESENT INVENTION

The present invention is described in details in combination with the drawings and following embodiments, which may be modified by a person of ordinary skill in the art without departing from the scope of the present invention.

It should be noted that when a component is referred to as being "fixed to" another component, it can be directly on the other component or an intermediate component may also be present. When an element is referred to as being "connected" to another element, it can be directly connected to the other element or an intermediate element may be present. When a component is referred to as being "disposed on" another component, it can be disposed directly on the other component or an intermediate component may be present. As used herein, the terms "vertical", "horizontal", "left", "right", and the like are used for descriptive purposes only.

Unless defined otherwise, all technical and scientific terms used herein have the same meaning as commonly understood by one of ordinary skill in the art. The terminology used herein in the description of the present invention is for the purpose of describing particular embodiments only and is not intended to be limiting of the present invention. As used herein, the term "and/or" includes any and all combinations of one or more of the associated listed items.

Figure 1:
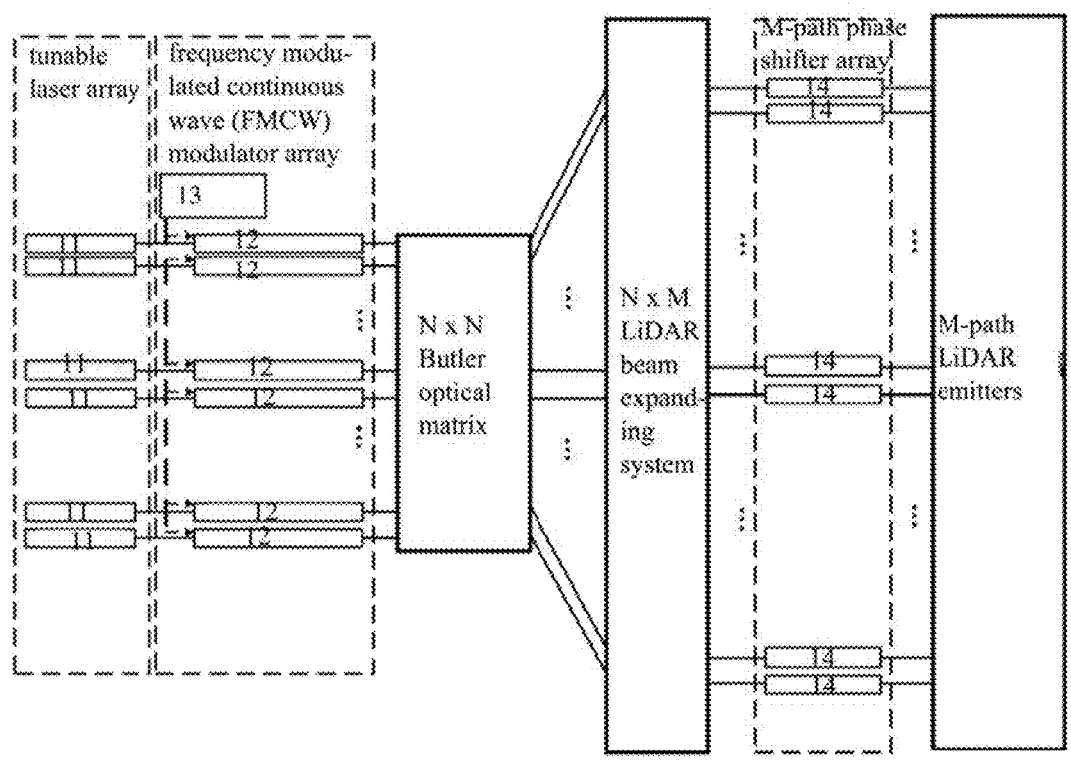
FIG. 1 is a schematic diagram showing the integrated two-dimensional multi-beam LiDAR transmitter based on the Butler matrix of the present invention.

Referring to FIG. 1, an N×M integrated two-dimensional multi-beam LiDAR transmitter based on the Butler matrix of the present invention comprises a tunable laser array, a frequency modulated continuous wave (FMCW) modulator array, an N×N Butler optical matrix network, an N×M optical beam expanding network, an M-path phase shifter array, and an M-path two-dimensional LiDAR emitters.

A narrow linewidth continuous light with equal light intensity output by the tunable laser array is respectively input into a FMCW modulator array to modulate an optical signal so as to generate a frequency modulated continuous optical signal. After passing through the N×N Butler optical matrix network, the energy of each path of optical signals is evenly distributed to N output ports, the phases are arranged in equal difference, and the optical signals input from different ports have different phase differences; and then the N×M optical beam expanding network further evenly distributes the optical signals to M paths, and the equal phase difference between adjacent paths is kept unchanged. The M-path phase shifter array generates equal-difference phases with continuously tunable phase differences for the M-path optical signals; and finally, the M-path two-dimensional LiDAR emitters transmit the optical signals, so that at most N different two-dimensional steerable optical beams are realized.

Figure 2:
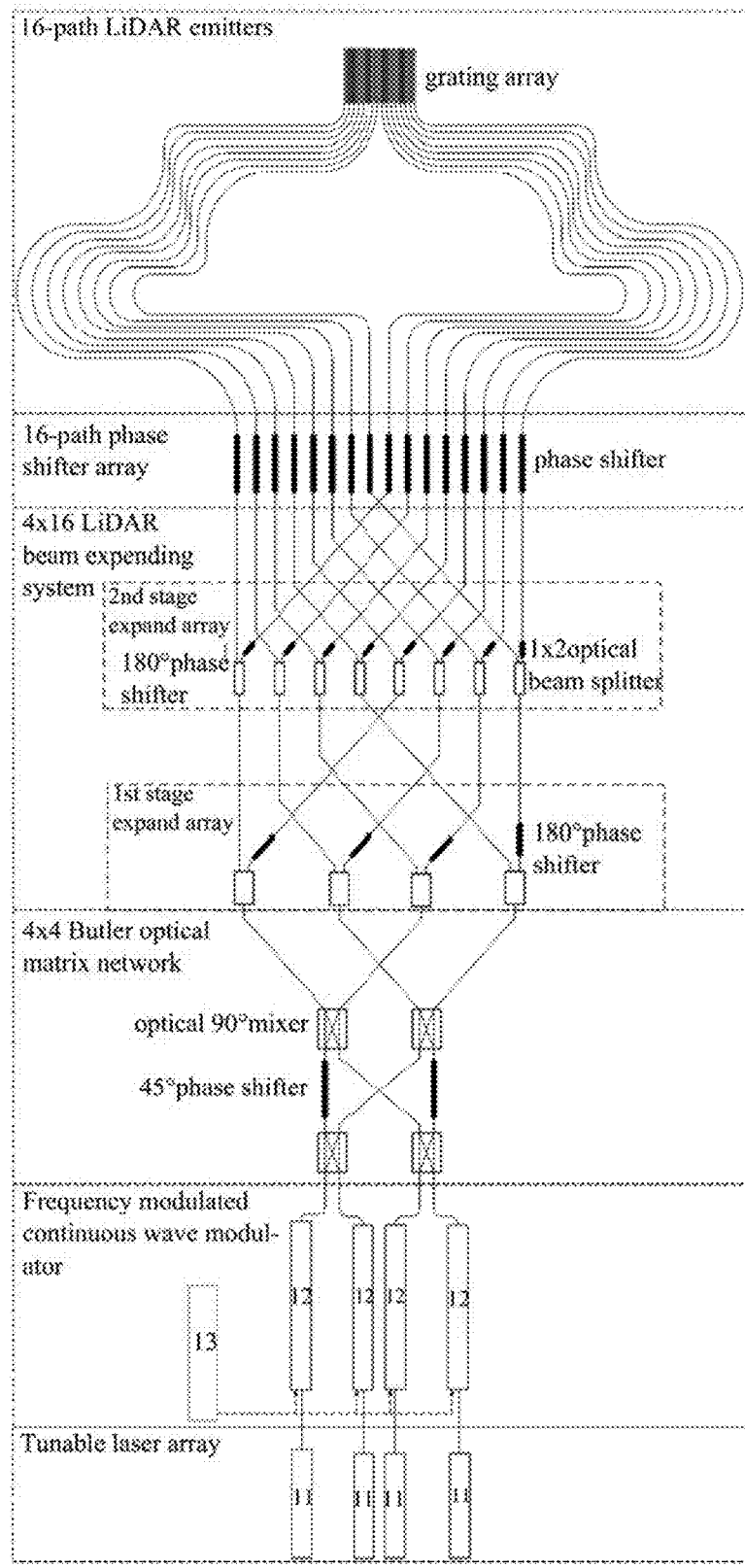
FIG. 2 is a schematic diagram showing one embodiment of the present invention with a 4×16 integrated two-dimensional multi-beam LiDAR transmitter based on the Butler matrix.

Referring to the embodiment of the present invention as shown in FIG. 2, it is a schematic diagram of a Butler matrix-based 4×16 integrated two-dimensional multi-beam LiDAR transmitter. As shown in FIG. 2, the tunable laser array of the system solution has four tunable lasers 11, and the FMCW modulator array has four FMCW modulators 12 and a chirped radio frequency modulation signal 13 generator. The solution adopts a 4×4 Butler optical matrix network, a 4×16 optical beam expanding network, a 16-path phase shifter array and a 16-path LiDAR emitters.

The 4×4 Butler optical matrix network has four optical hybrids, which are based on 2×2 multimode interferometer (MMI) structures; there are two 45° phase shifters, using a thermally tunable phase shifter structure. The 4×16 optical expanding beam network has a 2-stage expanding array with 12 1×2 optical splitters and 12 180° phase shifters. The 1×2 optical splitter adopts a 1×2 MMI structure, and the phase shifter adopts a thermally tunable phase shifter structure. The 16-path phase shifter array adopts a thermally tunable phase shifter structure. The 16-path LiDAR emitters adopt a 16-path unidirectional silicon waveguide array antenna structure. The phase shifters in the 4×4 Butler optical matrix network and the 4×16 optical beam expanding network only produce a fixed phase shift, and the phase shift of the 16-path phase shifter array is required to be continuously tunable.

As the optical signal propagation flow by each tunable laser is basically consistent, the optical signal propagation flow by the first tunable laser is illustrated as an example.

The first tunable laser generates a continuous optical wave with a narrow linewidth, and wavelength range is 1500-1600 nm. It is transmitted to a first FMCW modulator of the FMCW modulator array.

The first FMCW modulator is driven by a chirped radio frequency signal to generate a frequency modulated continuous optical signal. It is then sent into the first input port of the 4×4 Butler optical matrix network.

The frequency modulated continuous optical signal is equally distributed to four output ports of the Butler optical matrix network through corresponding 2×2 MMI optical hybrids and 45° phase shifters in the Butler optical matrix network, and the phases of the four output ports are respectively 45°, 90°, 135° and 180°, with all power being ¼.

The optical signals from the four output ports of the Butler optical matrix network are transmitted to the first-stage of the 4×16 optical beam expanding network through respective silicon waveguides; and after passing through the corresponding 1×2 MMIs and 180° phase shifters of the first-stage expanding array, original four array elements are expanded into eight channels, and the phases are 45°, 90°, 135°, 180°, 225°, 270°, 315°, and 0°, respectively, with all power being ⅛.

The optical signals from the 8 output ports of the first-stage of the 4×16 optical beam expanding network are transmitted to the second-stage of the 4×16 optical beam expanding network through respective silicon waveguides; and after passing through the corresponding 1×2 MMI and 180° phase shifters of the second-stage expanding array, the original 8 channels are expanded into 16 channels, and the phases are 45°, 90°, 135°, 180°, 225°, 270°, 315°, 0°, 45°, 90°, 135°, 180°, 225°, 270°, 315°, 0°, respectively, with all power being 1/16. Thus, the optical signals input from the first path generates energy-averaged 16-path optical signals with an phase difference of 45° at the output end of the expanding beam network.

The output optical signals from the 16 output ports of the 4×16 optical beam expanding network are transmitted into a 16-path phase shifter array through respective silicon waveguides, and the applied phases of the 16-path phase shifters are respectively m×φ (m=1, 2, . . . , and 16). Therefore, the adjacent ports have an equal phase difference of 45°+φ, and the phase difference can be continuously tuned by changing φ.

The 16-path optical signals passing through the 16-path phase shifters are finally transmitted to the 16-path LiDAR emitters and emitted to the far field. The angle of the transmitting optical beam vertical to the grating emitters can be steered by adjusting the phase shift of the 16-path phase shifter array, the angle parallel to the grating emitters can be steered by tuning the wavelength of the tunable laser arrays. The output beam is steered in two-dimensions.

The propagation flow of the optical signals transmitted by other tunable lasers is basically the same, except that the input ports of the 4×4 Butler optical matrix network are different, and the phase differences of the output ports are different and are −135°+φ, 135°+φ, −45°+φ, respectively, which finally leads to three different emitting angles of optical beam.

Figure 3A:
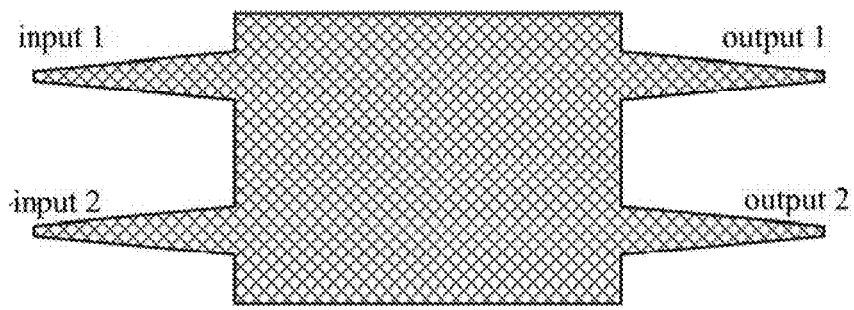
FIG. 3A is a schematic diagram showing a 90° optical hybrid using a 2×2 multimode interferometer.
Figure 3B:
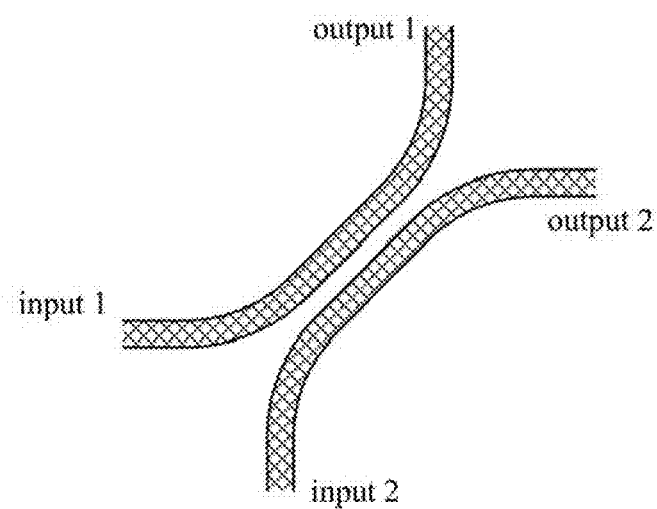
FIG. 3B is a schematic diagram showing a 90° optical hybrid using a directional coupler, both in the present invention.

FIGS. 3A and 3B are two structurally schematic diagrams of an optical hybrid, FIG. 3A is a 2×2 MMI, and FIG. 3B is a directional coupler, both having two input ports (input 1, input 2) and two output ports (output 1, output 2). The phase of optical signal is changed by 0 degrees from the input 1 to the output 1, and the power becomes ½ of the original. The phase of optical signal is increased by 90 degrees from the input 1 to the output 2, and the power becomes ½ of the original. Similarly, the phase of optical signal is changed by 0 degree from the input 2 to the output 2, and the power becomes ½ of the original. The phase of optical signal is increased by 90 degrees from the input 2 to the output 1, and the power becomes ½ of the original.

Figure 4A:
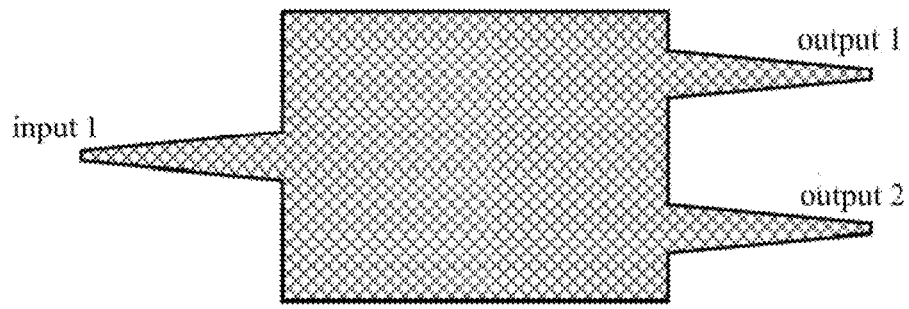
FIG. 4A is a schematic diagram showing a 1×2 optical beam splitter using a 1×2 MMI structure.
Figure 4B:
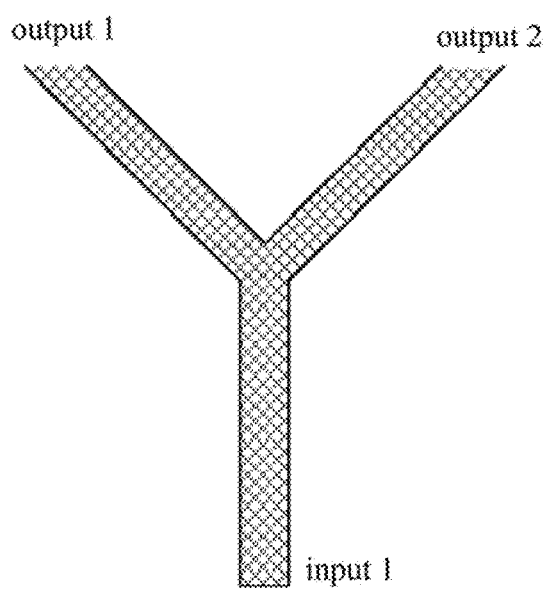
FIG. 4B is a schematic diagram showing a 1×2 optical beam splitter using a 1×2 Y-junction structure, both in the present invention.

FIG. 4A and FIG. 4B are two structurally schematic diagrams of a 1×2 optical beam splitter, FIG. 4A is a 1×2 MMI, FIG. 4B is a 1×2 Y-junction structure, both having one input port (input 1) and two output ports (output 1, output 2), wherein the phase of optical signal is changed by 0 degrees from the input 1 to the output 1, and the power becomes ½ of the original. The phase of optical signal is changed by 0 degrees from the input 1 to the output 2, and the power becomes ½ of the original.

Figure 5A:
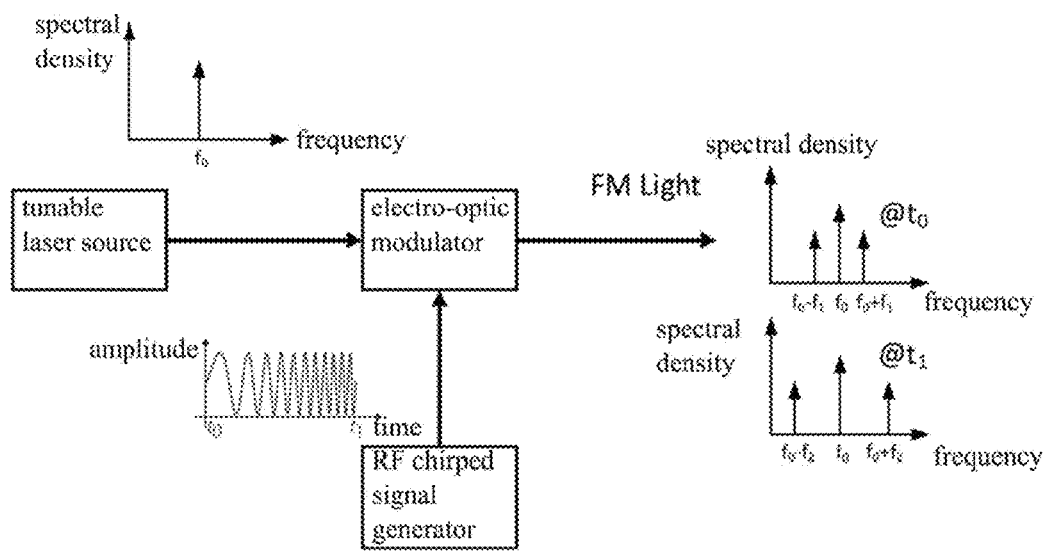
FIG. 5A is a block diagram showing a FMCW modulation structure based on an electro-optical modulator.
Figure 5B:
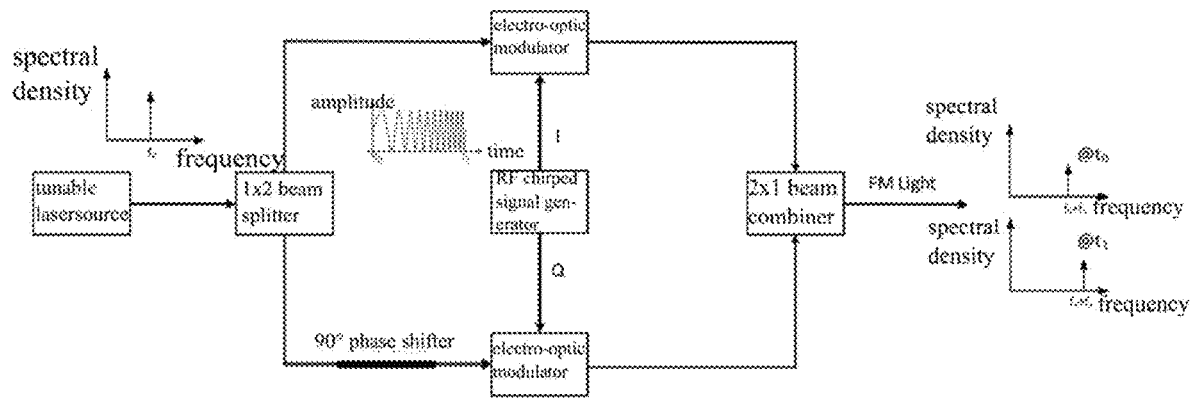
FIG. 5B is a block diagram showing a FMCW modulation structure based on an IQ modulator, both in the present invention.

FIG. 5A is a block diagram of a FMCW modulation structure based on an electro-optical modulator, and FIG. 5B is a block diagram of a FMCW modulation structure based on an IQ modulator. The input optical frequency is f0 which is generated by a tunable laser source. The chirped radio frequency modulation signal generator generates chirped radio frequency signals in the frequency range of f1-f2. The electro-optical modulator modulates a chirped radio frequency signal onto the optical carrier, and the generated FMCW signal is a double-sideband modulation signal. The IQ modulator divides an optical signal into two paths, respectively carries out carrier modulation on the optical signal, the two paths are mutually orthogonal, and the carrier-suppressed single-sideband modulation is realized at the output port. The frequency of the generated optical signal at different times varies as the frequency of the chirped radio frequency signal varies.

Figure 6A:
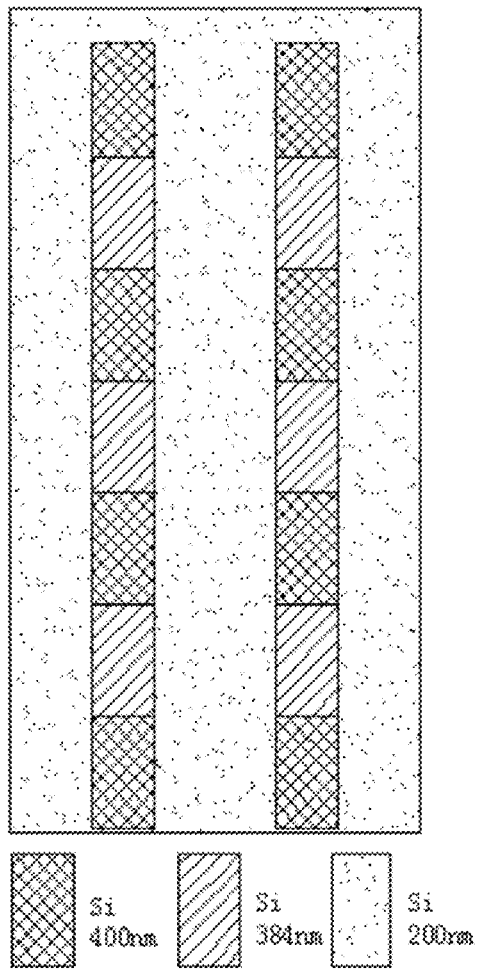
FIG. 6A is a top view of a shallow etched grating structure.
Figure 6B:
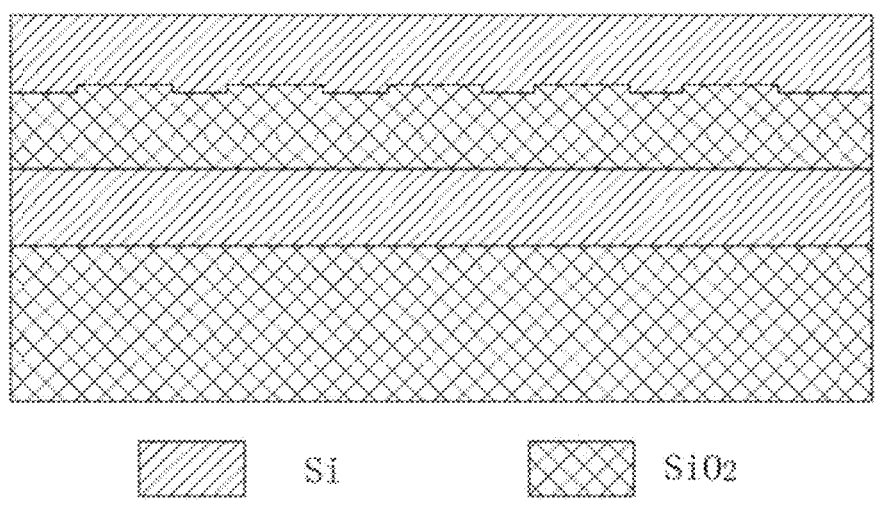
FIG. 6B is a cross-sectional view of a shallow etched grating structure in the present invention.

FIG. 6A is a top view of a shallow-etched grating structure, and FIG. 6B is a cross-sectional view of the shallow-etched grating structure, where the structure is mainly used for carrying out periodic shallowly etching on a ridge silicon waveguide, so that the thickness of the waveguide periodically changes between 400 nm and 384 nm, and the period is 490 nm. The ridge waveguide has a waveguide layer thickness of 220 nm and a slab layer thickness of 200 nm. Such a grating enables a wider steering angle and a smaller light beam divergence.

Figure 7A:
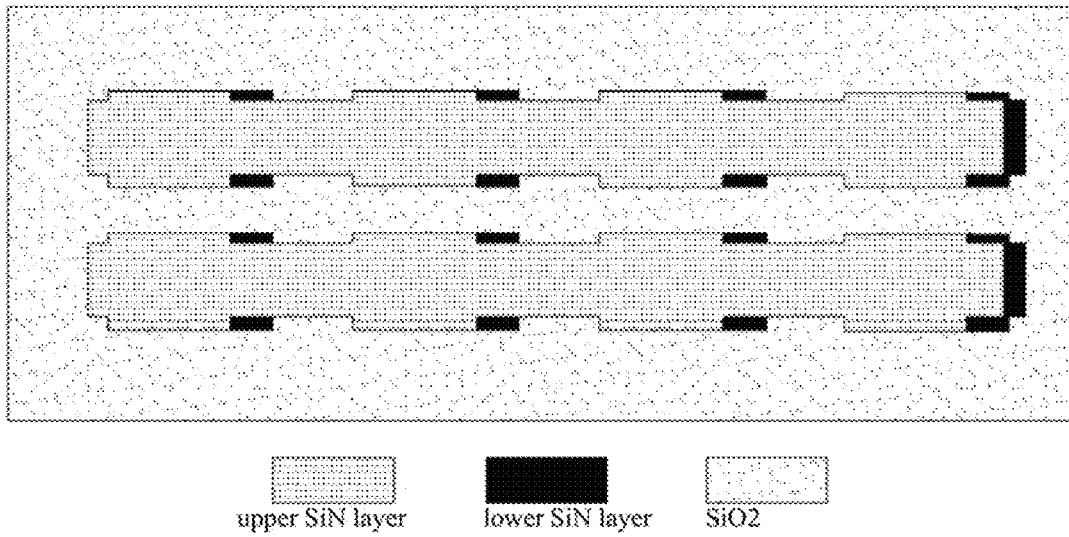
FIG. 7A is a top view of a double-layer silicon nitride grating.
Figure 7B:
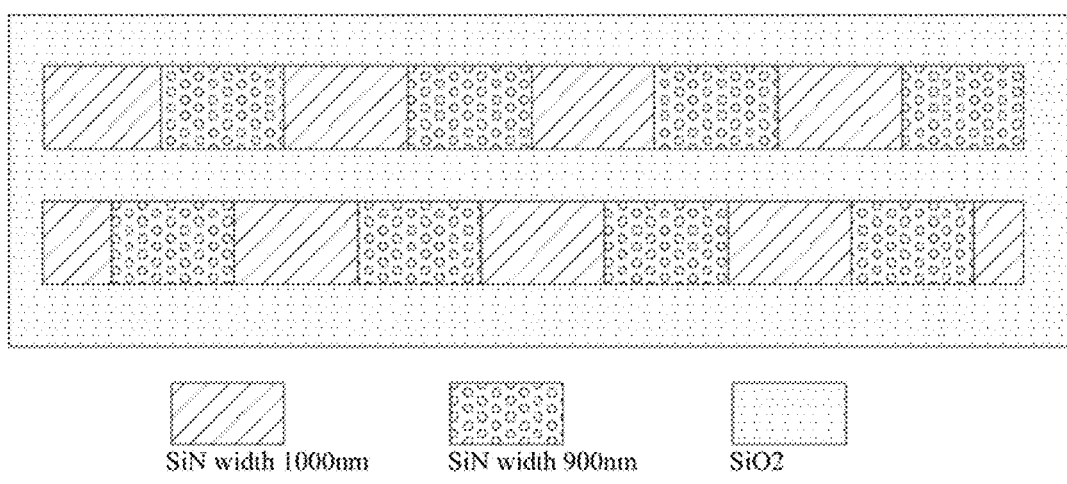
FIG. 7b is a cross-sectional view of a double-layer silicon nitride grating structure in the present invention.

FIG. 7A is a top view of a single-layer grating in a double-layer silicon nitride (SiN) grating, and FIG. 7B is a cross-sectional view of a double-layer silicon nitride (SiN) grating structure. The structure is mainly characterized in that the widths of two layers of silicon nitride waveguides are subjected to periodic shallowly etching, so that the widths of the waveguides periodically changes between 1000 nm and 900 nm. The thickness of the two layers of silicon nitride waveguides is 200 nm, the upper layer and the lower layer are separated by 100 nm, and the left layer and the right layer are shifted by 200 nm. Because of the small change of effective refractive index, the grating can achieve uniform transmission in millimeter length.

According to the solution provided by the present invention, the structure and the control are simple, the resolution of the LiDAR can be improved, the anti-interference capability and the survivability of the LiDAR are improved, the data rate is increased, and the performance of the LiDAR is greatly improved. Moreover, the integrated photonic technology has the advantages of small size and low power consumption.

Various other corresponding changes and modifications may be made by those skilled in the art in light of the above teachings and concepts, and all such changes and modifications are intended to fall within the scope of the appended claims.

We claim:

1. An integrated two-dimensional multi-beam LiDAR transmitter based on a Butler matrix, comprising
a tunable laser array,
a frequency modulated continuous wave modulator array,
an N×N Butler optical matrix network,
an N×M optical beam expanding network,
an M-path phase shifter array, and
an M-path two-dimensional LiDAR emitters,
wherein the tunable laser array is a narrow linewidth laser array, and N-path narrow linewidth continuous light output by the tunable laser array passes through the frequency modulated continuous wave modulator array to generate N-path frequency modulated continuous wave signals;
after being processed by the N×N Butler matrix network and the N×M optical beam expanding network, the energy of each path of the frequency modulated continuous optical signal is evenly distributed to M-path output ports, and output signals of adjacent output ports have equal phase differences;
the M-path phase shifter array generates equal-difference phases with continuously tunable phase differences for the M-path optical signals output by the M-path output ports;
the M-path optical signals with continuously adjustable phase differences are transmitted by the M-path two-dimensional LiDAR emitters so that no more than N different two-dimensional steerable optical beams are realized, wherein $N=2^n$ (n=1, 2, . . . ), $M=2^K \times N$ (K=1, 2, . . . ).

2. The LiDAR transmitter according to claim 1, wherein the tunable laser array comprises N tunable lasers;
the N tunable lasers simultaneously transmit N-path narrow linewidth continuous light with equal light intensity;
the wavelength of each path of the narrow linewidth continuous light is tunable; and
the tuning range is in a human eye safety area.

3. The LiDAR transmitter according to claim 1, wherein the frequency modulated continuous wave modulator array comprises N frequency modulated continuous wave modulators and a chirped radio frequency modulation signal generator,
wherein an $i^{th}$ path of the frequency modulated continuous wave modulator is connected with an $i^{th}$ path of the tunable laser (i=1, 2, . . . and N), and the chirped radio frequency modulation signal generator applies the chirped radio frequency signal onto the frequency modulated continuous wave modulator to generate a frequency modulated continuous optical signal; and
the frequency modulated continuous wave modulator is an electro-optical modulator or an I/Q modulator.

4. The LiDAR transmitter according to claim 1, wherein the N×N Butler optical matrix network comprises N/2×n 90° optical hybrids, N/2×(n−1) phase shifters and connecting waveguides;
the N×N Butler optical matrix network has N input ports and N output ports;

the i$^{th}$ input port is connected with the i$^{th}$ frequency modulated continuous wave modulator;

the optical signals of each input port are equally divided to all output ports; and adjacent output ports have a fixed same phase difference, and the optical signals input from different input ports differ in phase difference at the output ports, thereby forming N different optical beams.

5. The LiDAR transmitter according to claim 4, wherein the 90° optical hybrids are 2×2 multimode interferometers or directional couplers, and the 90° optical hybrids are provided with two input ports and two output ports; and the phase shifters are based on a thermo-optic effect or an electro-optic effect, and a phase tuning range of the phase shifters is 0-2π.

6. The LiDAR transmitter according to claim 1, wherein the N×M optical beam expanding network comprises a K-stage expanding array and connecting waveguides connecting adjacent two-stage expanding arrays, and a k$^{th}$ stage expanding array consists of N×k 1×2 optical beam splitters and N×k 180° phase shifters, wherein (k=1, 2, . . . , K);

the N×M optical beam expanding network has N input ports and M output ports, wherein M=N×2$^K$ (K= 1, 2, . . . ), and the i$^{th}$ input port of the N×M optical beam expanding network is connected with the i$^{th}$ output port of the N×N Butler optical matrix network; and the N×M optical beam expanding network evenly distributes and expands N-path optical signals output from the N×N Butler optical matrix network into M-path optical signals, adjacent output signals have equal phase differences, and the phase differences of the output signals are consistent with the phase differences of the input signals.

7. The LiDAR transmitter according to claim 6, wherein the 1×2 optical beam splitters are 1×2MMI structures or 1×2 Y-junction structures, the 180° phase shifters are 180° phase shifters based on a thermo-optic effect or an electro-optic effect, and a phase tuning range of the 180° phase shifters is 0-2π.

8. The LiDAR transmitter according to claim 1, wherein the M-path phase shifter array comprises an M-path phase shifter, the m$^{th}$ (m=1, 2, . . . , M) path phase shifter is connected with the m$^{th}$ path output port of the N×M optical beam expanding network, the M-path phase shifter array performs phase shift on an input optical signal, so that the phase of the output signal has an equal difference relationship, and the equal difference quantity is continuously tunable; and the M-path phase shifter is a phase shifter based on a thermo-optic effect or an electro-optic effect, and the phase tuning range of the phase shifter is 0-2π.

9. The LiDAR transmitter according to claim 1, wherein the M-path two-dimensional LiDAR emitters comprise an M-path grating-based optical antennas, and the m$^{th}$ (m= 1, 2, . . . , M) grating-based optical antenna is connected with the m$^{th}$ path phase shifter and transmits the m$^{th}$ path optical signal, wherein the M-path grating-based optical antennas are double-layer silicon nitride gratings or a shallow-etched silicon waveguide gratings.

10. The LiDAR transmitter according to claim 9, wherein the angle of the transmitting optical beam vertical to the M-path grating-based optical antennas is steered by adjusting the phase shift of the M-path phase shifter array, the angle of the transmitting optical beam parallel to the M-path grating-based optical antennas is steered by adjusting the wavelength of the tunable laser array, so that the transmitted optical beam is steered in two dimensions, and N different beams may be realized because different input optical signals have different equal phase differences at the output ports.

* * * * *